United States Patent
Sampei

(10) Patent No.: US 10,532,430 B2
(45) Date of Patent: Jan. 14, 2020

(54) LASER MACHINING APPARATUS

(71) Applicant: DISCO CORPORATION, Tokyo (JP)

(72) Inventor: Takashi Sampei, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 45 days.

(21) Appl. No.: 15/001,447

(22) Filed: Jan. 20, 2016

(65) Prior Publication Data

US 2016/0207145 A1    Jul. 21, 2016

(30) Foreign Application Priority Data

Jan. 21, 2015    (JP) ................................ 2015-009273

(51) Int. Cl.
*B23K 26/402*    (2014.01)

(52) U.S. Cl.
CPC ................................ *B23K 26/402* (2013.01)

(58) Field of Classification Search
CPC .. B23K 26/402; B23K 26/0853; B23K 26/36; B23K 2203/56
USPC ........................................................ 425/162
See application file for complete search history.

(56) References Cited

FOREIGN PATENT DOCUMENTS

JP    2012-161799    8/2012

OTHER PUBLICATIONS

English Translation of JP2012161799. Takahashi Satoshi. Aug. 30, 2012.*
English translation of JP2008042032, Feb. 21, 2008.*

* cited by examiner

*Primary Examiner* — Matthew J Daniels
*Assistant Examiner* — Hana C Page
(74) *Attorney, Agent, or Firm* — Greer, Burns & Crain Ltd.

(57) ABSTRACT

A laser machining apparatus has a workpiece holding unit, a laser irradiation unit, a machining feed unit that moves the holding unit and the laser irradiation unit in a machining feed direction, an indexing feed unit that moves the holding unit and the laser irradiation unit in an indexing feed direction, and a control unit that controls the operation of each component. The time required to stop the laser irradiation unit relative to the holding unit can be denoted by 'ta' and that required to index the irradiation position of the laser beam at the next scheduled division line can be denoted by 'tb.' When tb>ta, the control unit initiates the stopping and indexing simultaneously after a machining step and takes advantage of remaining time (tb−ta) following the end of the stopping to start to accelerate the laser irradiation unit relative to the holding unit.

2 Claims, 3 Drawing Sheets

LASER MACHINING APPARATUS

BACKGROUND OF THE INVENTION

Field of the Invention

The present invention relates to a laser machining apparatus for machining a workpiece such as semiconductor wafer.

Description of the Related Art

A semiconductor wafer having a device such as IC formed in each of the areas partitioned by scheduled division lines is machined, for example, by a laser machining apparatus, thus being divided into a plurality of device chips, each corresponding to a device. Such a laser machining apparatus generally includes a chuck table and a laser irradiation unit. The chuck table sucks and holds a semiconductor wafer or other workpiece. The laser irradiation unit irradiates a laser beam. In order to machine a workpiece with this laser machining apparatus, a laser beam is irradiated from the laser irradiation unit while at the same time relatively moving the laser irradiation unit and the chuck table in a direction parallel to the scheduled division lines (hereinafter also referred to as machining feed). This allows a laser beam to be irradiated along the scheduled division lines of the workpiece sucked and held by the chuck table, thus machining the workpiece.

Incidentally, a machining method is commercially available which machines a workpiece by reciprocally moving the laser irradiation unit and the chuck table in a direction parallel to the scheduled division lines for enhanced machining efficiency of a laser machining apparatus such as the one described above. With this machining method, for example, the relative movement (machining feed) of the laser irradiation unit and the chuck table is stopped after the end of machining in the forward trip. Next, the irradiation position of the laser beam is set at the extension of the scheduled division line to be machined in the backward trip by relatively moving the laser irradiation unit and the chuck table in a direction perpendicular to the scheduled division lines (hereinafter also referred to as indexing feed). Then, machining in the backward trip is initiated.

Further, a new technology that focuses on the amounts of time required to stop machining feed and required for indexing feed (refer, for example, to Japanese Patent Laid-Open No. 2012-161799) has been proposed. This technology stops machining feed and conducts indexing feed in parallel, thus reducing the amount of time required for indexing feed to substantially zero and shortening the amount of time until next machining for enhanced machining efficiency.

SUMMARY OF THE INVENTION

Efforts are underway in recent years to upsize workpieces for enhanced device chip productivity. As workpiece sizes grow, so does the number of scheduled division lines to be machined, thus giving rise to demand for even higher machining efficiency of a laser machining apparatus.

In light of the foregoing, it is an object of the present invention to provide a laser machining apparatus which offers even higher machining efficiency.

In accordance with an aspect of the present invention, there is provided a laser machining apparatus for machining a workpiece by irradiating a laser beam. The laser machining apparatus includes holding means, laser irradiation means, machining feed means, indexing feed means, and control means. The holding means holds the workpiece. The laser irradiation means irradiates a laser beam onto the workpiece held by the holding means. The machining feed means relatively moves the holding means and the laser irradiation means in a machining feed direction. The indexing feed means relatively moves the holding means and the laser irradiation means in an indexing feed direction. The control means controls the operation of each component. The control means performs machining, stopping, indexing, and starting steps. The machining step irradiates a laser beam from the laser irradiation means while at the same time moving the laser irradiation means relative to the holding means in a first direction parallel to the machining feed direction at a given speed, thus machining the workpiece, held by the holding means, along an arbitrary scheduled division line up to an end portion of the workpiece. The stopping step stops, after the machining step, the laser irradiation means relative to the holding means. The indexing step relatively moves the holding means and the laser irradiation means in the indexing feed direction, thus setting the irradiation position of the laser beam at the extension of a scheduled division line to be machined next. The starting step accelerates, after the stopping step, the laser irradiation means relative to the holding means in a second direction opposite to the first direction, thus bringing the laser irradiation means to the given speed before the laser beam reaches the end portion of the workpiece. During the steps, letting the amount of time required for the stopping step be denoted by 'ta' and the amount of time required for the indexing step be denoted by 'tb,' and when tb>ta, the control means initiates the stopping step and the indexing step simultaneously after the machining step and takes advantage of remaining time (tb−ta) of the indexing step following the end of the stopping step to perform the starting step.

If the amount of time required for the indexing step is longer than that for the stopping step, the laser machining apparatus according to the present invention initiates the stopping and indexing steps simultaneously and takes advantage of remaining time of the indexing step following the end of the stopping step to perform the starting step, thus reducing the amount of time required for the stopping step to substantially zero and substantially shortening the amount of time required for the starting step. That is, the laser machining apparatus according to the present invention performs not only the stopping and indexing steps but also the indexing and starting steps, in parallel, shortening the amount of time until next machining for even higher machining efficiency.

The above and other objects, features and advantages of the present invention and the manner of realizing them will become more apparent, and the invention itself will best be understood from a study of the following description and an appended claim with reference to the attached drawings showing a preferred embodiment of the invention.

DETAILED DESCRIPTION OF THE PREFERRED EMBODIMENT

Figure 1:
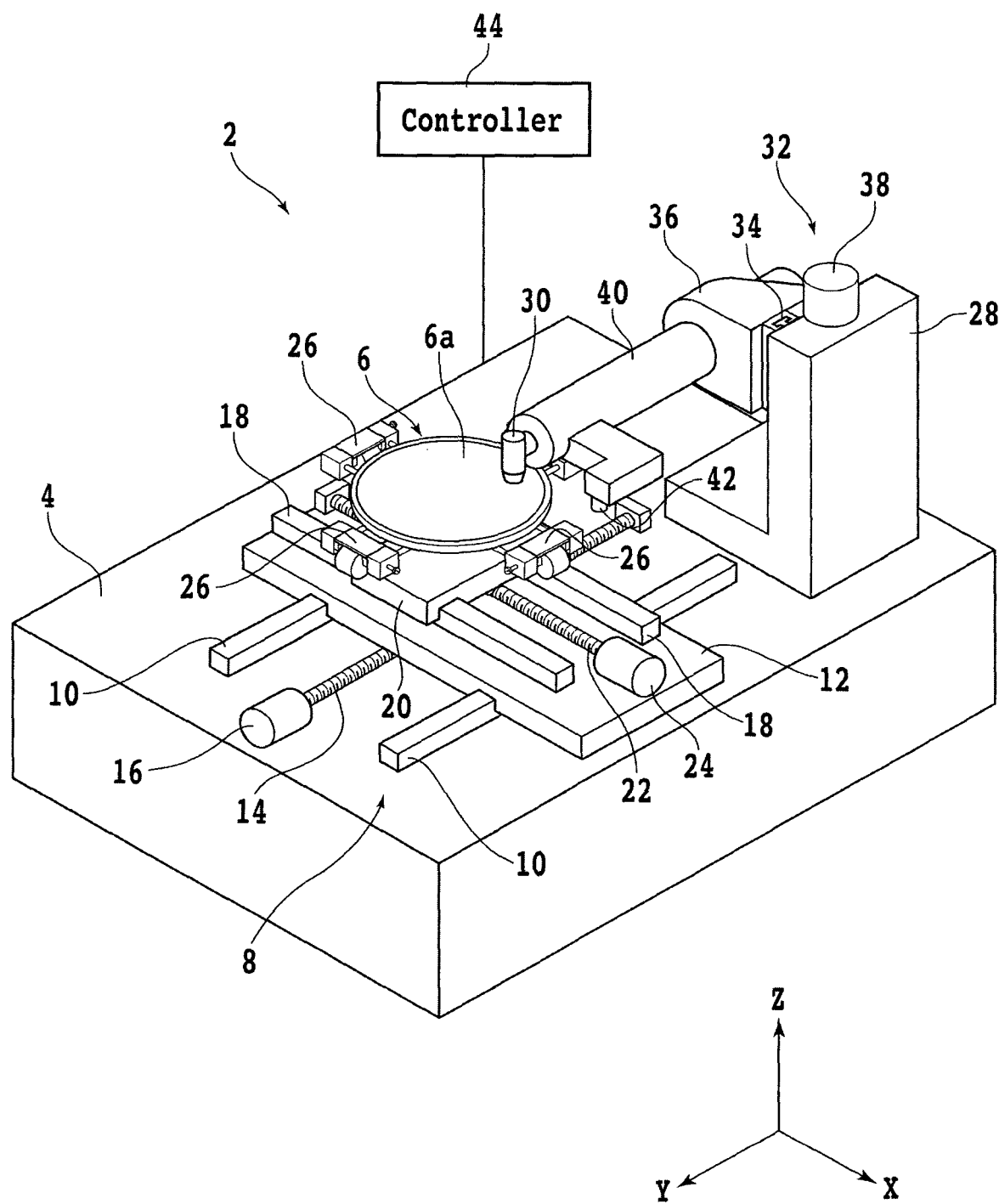
FIG. 1 is a diagram schematically illustrating a laser machining apparatus.

A detailed description will be given below of an embodiment of the present invention with reference to the accompanying drawings. FIG. 1 is a diagram schematically illustrating a laser machining apparatus according to the present embodiment. As illustrated in FIG. 1, a laser machining apparatus 2 according to the present embodiment includes a base 4 in the shape of a rectangular parallelepiped to which each structure is mounted. A horizontal movement mechanism (machining feed means and indexing feed means) 8 is provided on the top face of the base 4. The horizontal movement mechanism 8 moves a chuck table (holding means) 6 in the X- and Y-axis directions (machining and indexing feed directions).

The horizontal movement mechanism 8 includes a pair of Y-axis guide rails 10 that are fastened to the top face of the base 4 and run parallel to the Y-axis direction. A Y-axis movement table 12 is arranged on the Y-axis guide rails 10 in a slidable manner. A nut section (not shown) is provided on the rear face side (bottom face side) of the Y-axis movement table 12. A Y-axis ball screw 14 that runs parallel to the Y-axis guide rails 10 is screwed into the nut section. The Y-axis ball screw 14 has its one end portion coupled to a Y-axis pulse motor 16. As the Y-axis ball screw 14 is rotated by the Y-axis pulse motor 16, the Y-axis movement table 12 moves in the Y-axis direction along the Y-axis guide rails 10.

A pair of X-axis guide rails 18 that run parallel to the X-axis direction are fastened to the front face (top face) of the Y-axis movement table 12. An X-axis movement table 20 is arranged on the X-axis guide rails 18 in a slidable manner. A nut section (not shown) is provided on the rear face side (bottom face side) of the X-axis movement table 20. An X-axis ball screw 22 that runs parallel to the X-axis guide rails 18 is screwed into the nut section. The X-axis ball screw 22 has its one end portion coupled to an X-axis pulse motor 24. As the X-axis ball screw 22 is rotated by the X-axis pulse motor 24, the X-axis movement table 20 moves in the X-axis direction along the X-axis guide rails 18.

Figure 2:
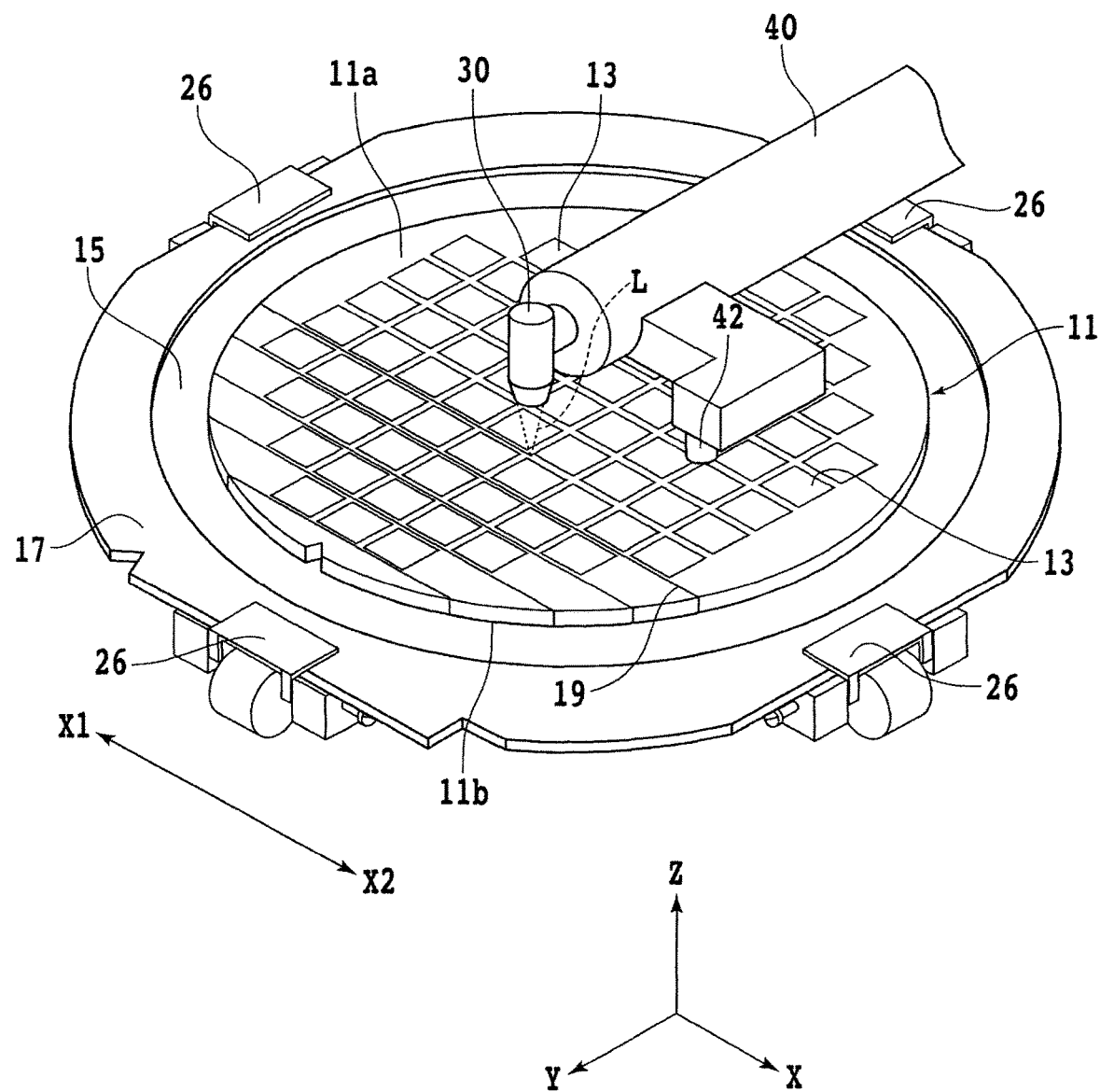
FIG. 2 is a perspective view schematically illustrating the manner in which a workpiece is machined.

The chuck table 6 is arranged on the front face side (top face side) of the X-axis movement table 20 to suck and hold a workpiece 11 (refer to FIG. 2). The workpiece 11 is, for example, a disk-shaped semiconductor wafer or sapphire substrate. The side of a front face 11a of the workpiece 11 is divided into a device area in the center and a peripheral excess area that surrounds the device area. The device area is further partitioned into a plurality of areas by scheduled division lines (streets) that are arranged in a grid pattern, with a device 13 such as IC formed in each of the areas. Adhesive tape 15 is applied to the side of a rear face 11b of the workpiece 11, with an annular frame 17 fastened to the peripheral portion of the adhesive tape 15.

As illustrated in FIG. 1, the front face (top face) of the chuck table 6 is a holding face 6a adapted to suck and hold the workpiece 11. The holding face 6a is connected to a suction source (not shown) via a channel (not shown) formed inside the chuck table 6. A rotation mechanism (not shown) is provided under the chuck table 6. The chuck table 6 rotates about the Z-axis thanks to this rotation mechanism. Further, four clamps 26 are provided around the chuck table 6 to grip and fasten the annular frame 17 from four directions.

A support structure 28 in the approximate shape of letter L as seen in front view is provided behind the horizontal movement mechanism 8. A vertical movement mechanism 32 is provided on one lateral face of the support structure 28 to move a laser irradiation unit (laser irradiation means) 30 in the Z-axis direction (vertically). The vertical movement mechanism 32 includes a Z-axis guide rail 34 that is fastened to one lateral face of the support structure 28 and runs parallel to the Z-axis direction. A support block 36 is arranged on the Z-axis guide rail 34 in a slidable manner. A nut section (not shown) is provided on the rear face side (on the side of the support structure 28) of the support block 36. A Z-axis ball screw (not shown) that runs parallel to the Z-axis guide rail 34 is screwed into the nut section. The Z-axis ball screw has its one end portion coupled to a Z-axis pulse motor 38. As the Z-axis ball screw is rotated by the Z-axis pulse motor 38, the support block 36 moves in the Z-axis direction along the Z-axis guide rail 34.

A support arm 40 that supports the laser irradiation unit 30 is fastened to the support block 36. The laser irradiation unit 30 is provided on the support arm 40 to irradiate a laser beam L downward (refer to FIG. 2). The laser irradiation unit 30 includes a condenser (not shown) to irradiate the workpiece 11, sucked and held by the chuck table 6, with the laser beam L oscillated in a pulse form by a laser oscillator (not shown).

A camera 42 is provided adjacent to the laser irradiation unit 30 to capture an image of the side of the front face 11a of the workpiece 11. The image captured by the camera 42 is used, for example, to adjust the position of the laser irradiation unit 30 relative to the workpiece 11.

The chuck table 6, the horizontal movement mechanism 8, the laser irradiation unit 30, the vertical movement mechanism 32, the camera 42, and other components are connected to a controller (control means) 44. The controller 44 controls the operation of each of the components for proper machining of the workpiece 11.

FIG. 2 is a perspective view schematically illustrating the manner in which the workpiece 11 is machined by the laser machining apparatus 2 according to the present embodiment. The controller 44 brings the irradiation position of the laser beam L at the extension of the scheduled division line to be machined first, and then machines the workpiece 11 by repeating machining, stopping, indexing, and starting steps which will be described later. It should be noted that although the laser machining apparatus 2 according to the present embodiment moves the chuck table 6 in the X- and Y-axis directions, the laser machining apparatus according to the present invention need only be configured so that the chuck table 6 and the laser irradiation unit 30 are relatively moved. More specifically, for example, the laser irradiation unit 30 can be moved in the X- and Y-axis directions. In the description given below, therefore, reference will be made only to the relative movement of the chuck table 6 and the laser irradiation unit 30.

In the machining step, the laser beam L is irradiated from the laser irradiation unit 30 while at the same time moving the laser irradiation unit 30 relative to the chuck table 6 in a first direction (e.g., direction X1) parallel to the X-axis direction at an arbitrary speed v. The speed v is set, for example, in accordance with conditions including the material and thickness of the workpiece 11, and the wavelength, power density, and repetition frequency of the laser beam L. This makes it possible to form a starting point area 19 along scheduled division lines to be machined as illustrated in FIG. 2. The starting point area 19 serves as a starting point for division. The starting point area 19 may be a machined groove formed by using a laser beam of a wavelength that is readily absorbed by the workpiece 11 or a modified area formed by using a laser beam of a wavelength that is difficult to be absorbed by the workpiece 11. The machining step ends when the workpiece 11 is machined to its end portion along the scheduled division lines to be machined.

The machining step is followed by the stopping step in which the laser irradiation unit 30 is stopped relative to the chuck table 6. Further, the indexing step is performed in which the irradiation position of the laser beam L is set at the extension of the scheduled division line to be machined next by relatively moving the chuck table 6 and the laser irradiation unit 30 in the Y-axis direction. Still further, after the stopping step, the starting step is performed in which the laser irradiation unit 30 is accelerated to the given speed v relative to the chuck table 6 in a second direction (e.g., direction X2) opposite to the first direction. In the starting step, the laser irradiation unit 30 is accelerated to the given speed v relative to the chuck table 6 before the laser beam L (irradiation position of the laser beam L) reaches the end portion of the workpiece 11.

The starting step is followed by the machining step again. It should be noted that, in this machining step, the laser beam L is irradiated from the laser irradiation unit 30 while at the same time moving the laser irradiation unit 30 relative to the chuck table 6 in the second direction (e.g., direction X2) at the speed v. Thus, machining the workpiece 11 by reciprocally moving the laser irradiation unit 30 relative to the chuck table 6 provides higher machining efficiency than machining only in the forward or backward trip.

Figure 3A:
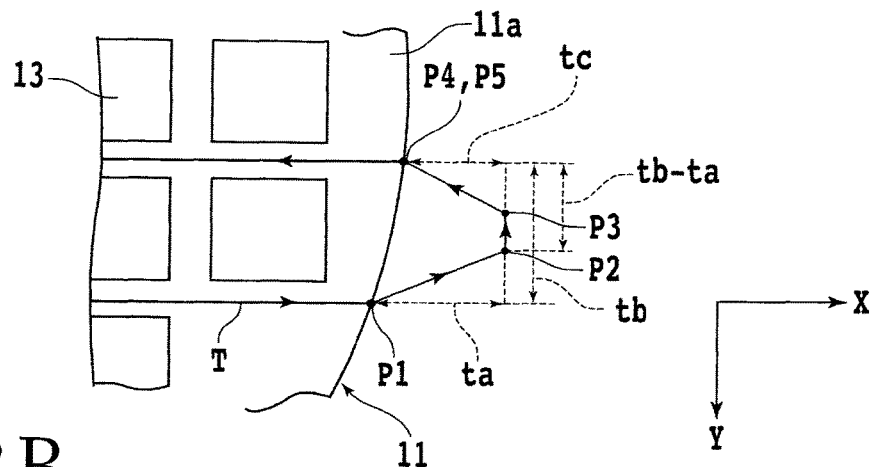
FIGS. 3A to 3C are plan views schematically illustrating examples of paths traced by a laser beam when indexing and starting steps are performed in parallel.
Figure 3B:
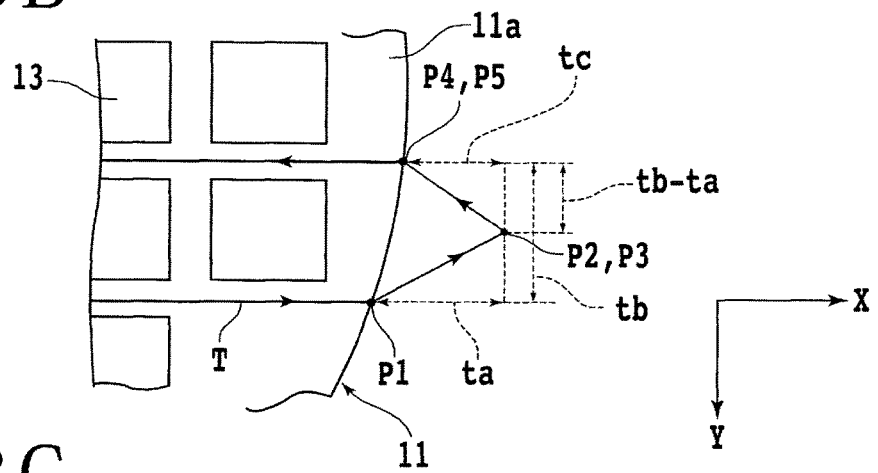
Figure 3C:
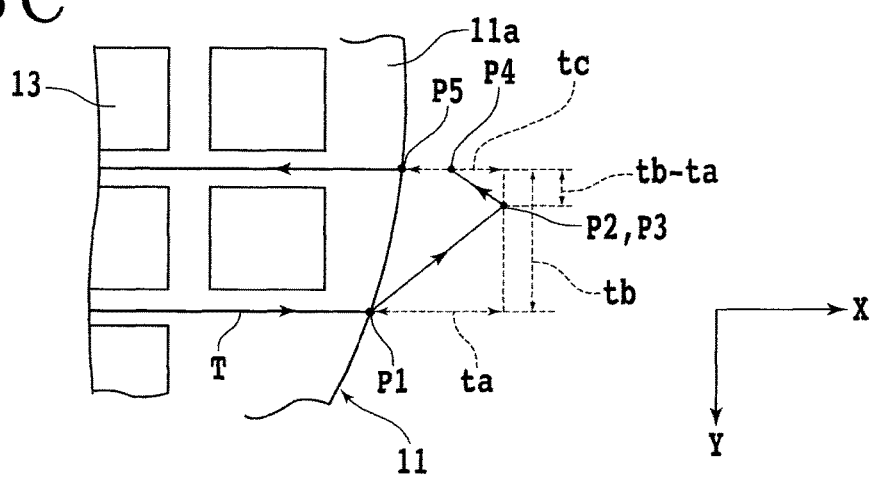

Further, when performing the stopping, indexing, and starting steps, the controller 44 performs the stopping and indexing steps in parallel. Still further, if a given condition is satisfied, the controller 44 performs the indexing and starting steps in parallel. More specifically, letting the amount of time required for the stopping step be denoted by 'ta' and that required for the indexing step be denoted by 'tb,' and when tb>ta is satisfied, the controller 44 performs the indexing and starting steps in parallel. FIGS. 3A to 3C are plan views schematically illustrating examples of paths traced by the laser beam L when the indexing and starting steps are performed in parallel. As illustrated in FIGS. 3A to 3C, when the machining step ends at a point P1 on a path T of the laser beam L, the stopping and indexing steps are initiated simultaneously. If tb>ta is satisfied, the stopping step ends before the indexing step ends. Therefore, the remaining time of the indexing step immediately after the end of the stopping step is tb−ta.

Here, letting the amount of time required for the starting step be denoted by 'tc,' the path T that satisfies tb−ta>tc is as shown in FIG. 3A. That is, the stopping step ends at a point P2, and the starting step begins at a subsequent arbitrary point P3. That is, only the indexing step is performed between the points P2 and P3. For example, if the starting step begins when the remaining time of the indexing step is equal to 'tc,' the indexing step ends at a point P4, and the starting step ends simultaneously at a point P5 as illustrated in FIG. 3A. Thus, it is preferred that the starting step should be initiated when the remaining time of the indexing step is not shorter than 'tc' to enhance the machining efficiency.

On the other hand, the path T that satisfies tb−ta=tc is as shown in FIG. 3B. That is, the stopping step ends at the point P2, and the starting step begins simultaneously at the point P3. Further, the indexing step ends at the point P4, and the starting step ends simultaneously at the point P5.

Further, the path T that satisfies tb−ta<tc is as shown in FIG. 3C. Also in this case, the stopping step ends at the point P2, and the starting step begins simultaneously at the point P3. On the other hand, because tb−ta<tc, the indexing step ends earlier at the point P4. Then, the starting step ends at the point P5.

Thus, if the amount of time 'tb' required for the indexing step is longer than the amount of time 'ta' required for the stopping step, the laser machining apparatus 2 according to the present embodiment initiates the stopping and indexing steps simultaneously and takes advantage of remaining time (tb−ta) of the indexing step following the end of the stopping step to perform the starting step, thus reducing the amount of time required for the stopping step to substantially zero and shortening the amount of time required for the starting step. That is, the laser machining apparatus 2 according to the present embodiment performs not only the stopping and indexing steps but also the indexing and starting steps, in parallel, shortening the amount of time until next machining for even higher machining efficiency.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. A laser machining apparatus for machining a workpiece by irradiating a laser beam, the laser machining apparatus comprising:
   holding means for holding the workpiece;
   laser irradiation means for irradiating a laser beam onto the workpiece held by the holding means;
   machining feed means for relatively moving the holding means and the laser irradiation means in a machining feed direction;
   indexing feed means for relatively moving the holding means and the laser irradiation means in an indexing feed direction; and
   control means configured to control the operation of each component, wherein the control means performs,
      a machining step of irradiating a laser beam from the laser irradiation means while at the same time moving the laser irradiation means relative to the holding means in a first direction parallel to the machining feed direction at a given speed so as to machine the workpiece, held by the holding means, along an arbitrary scheduled division line up to an end portion of the workpiece,
      a stopping step of stopping, after the machining step, the laser irradiation means relative to the holding means,
      an indexing step of relatively moving the holding means and the laser irradiation means in the indexing feed direction so as to set the irradiation position of the laser beam at an extension of a scheduled division line to be machined next, and
      a starting step of accelerating, after the stopping step, the laser irradiation means relative to the holding means in a second direction opposite to the first direction so as to bring the laser irradiation means to the given speed before the laser beam reaches the end portion of the workpiece, and
   wherein the control means is configured to perform the stopping and indexing steps simultaneously for a first time period after the machining step, perform the indexing step without the stopping step for a second time period after the first time period, and cause the starting step to be performed simultaneously with the indexing step for a third time period after the second time period until a start of the machining step at a next scheduled division line.

2. A laser machining apparatus for machining a workpiece by irradiating a laser beam, the laser machining apparatus comprising:
   holding means for holding the workpiece;
   laser irradiation means for irradiating a laser beam onto the workpiece held by the holding means;

machining feed means for relatively moving the holding means and the laser irradiation means in a machining feed direction;

indexing feed means for relatively moving the holding means and the laser irradiation means in an indexing feed direction; and control means configured to control the operation of each component, wherein the control means performs, a machining step of irradiating a laser beam from the laser irradiation means while at the same time moving the laser irradiation means relative to the holding means in a first direction parallel to the machining feed direction at a given speed so as to machine the workpiece, held by the holding means, along an arbitrary scheduled division line up to an end portion of the workpiece, a stopping step of stopping, after the machining step, the laser irradiation means relative to the holding means, an indexing step of relatively moving the holding means and the laser irradiation means in the indexing feed direction so as to set the irradiation position of the laser beam at an extension of a scheduled division line to be machined next, and a starting step of accelerating, after the stopping step, the laser irradiation means relative to the holding means in a second direction opposite to the first direction so as to bring the laser irradiation means to the given speed before the laser beam reaches the end portion of the workpiece, and wherein the control means is configured to perform the stopping and indexing steps simultaneously for a first time period after the machining step, perform the starting step simultaneously with the indexing step for a second time period after the first time period, and perform the starting step without the indexing step for a third time period after the second time period until a start of the machining step at a next scheduled division line.

* * * * *